United States Patent [19]
Hawley

[11] 4,189,881
[45] Feb. 26, 1980

[54] PHOTOVOLTAIC ROOF CONSTRUCTION

[75] Inventor: Wilbur W. Hawley, Danville, Calif.

[73] Assignee: Atlantic Richfield Company, Los Angeles, Calif.

[21] Appl. No.: 19,960

[22] Filed: Mar. 12, 1979

[51] Int. Cl.² ............... E04D 12/00; H01L 31/04
[52] U.S. Cl. .............................. 52/220; 52/509; 52/512; 136/89 P; 136/89 AC; 237/2 A
[58] Field of Search ........... 136/89 P, 89 AC, 89 HY; 52/220, 509, 512; 237/1 A

[56] References Cited
U.S. PATENT DOCUMENTS

| | | | |
|---|---|---|---|
| 2,192,719 | 3/1940 | Tapman | 52/464 |
| 3,893,506 | 7/1975 | Laing | 165/18 |
| 4,040,867 | 8/1977 | Forestieri et al. | 136/89 P |
| 4,080,221 | 3/1978 | Manelas | 136/89 PC |

Primary Examiner—Aaron Weisstuch
Attorney, Agent, or Firm—Roderick W. MacDonald

[57] ABSTRACT

In a batten-seam roof construction employing at least one photovoltaic cell module, the electrical conduits employed with the at least one photovoltaic cell module are disposed primarily under the battens of the roof.

4 Claims, 4 Drawing Figures

PHOTOVOLTAIC ROOF CONSTRUCTION

CROSS REFERENCE TO RELATED APPLICATIONS

None.

BACKGROUND OF THE INVENTION

One conventional roof structure found throughout the world today is the batten-seam roof which will be described in greater detail below.

There is a growing trend for use of solar devices on roofs. A particularly useful device is the photovoltaic cell module which converts sunlight directly into electricity.

SUMMARY OF THE INVENTION

In accordance with this invention a batten-seam roof is particularly suitable, both functionally and aesthetically, for use in conjunction with one or more photovoltaic cell modules. The necessary electrical conduits for connecting a plurality of photovaltaic cell modules together and for carrying the generated electricity to the interior of the building are disposed primarily under the battens of the roof thereby providing those conduits from the elements and at the same time preserving the accepted and pleasing appearance for batten-seam roofs.

Accordingly, it is an object of this invention to provide a new and improved roof construction employing a combination of batten-seam roofing and at least one photovoltaic cell module.

Other aspects, objects and advantages of this invention will be apparent to those skilled in the art from this disclosure and the appended claims.

DETAILED DESCRIPTION OF THE INVENTION

Figure 1:
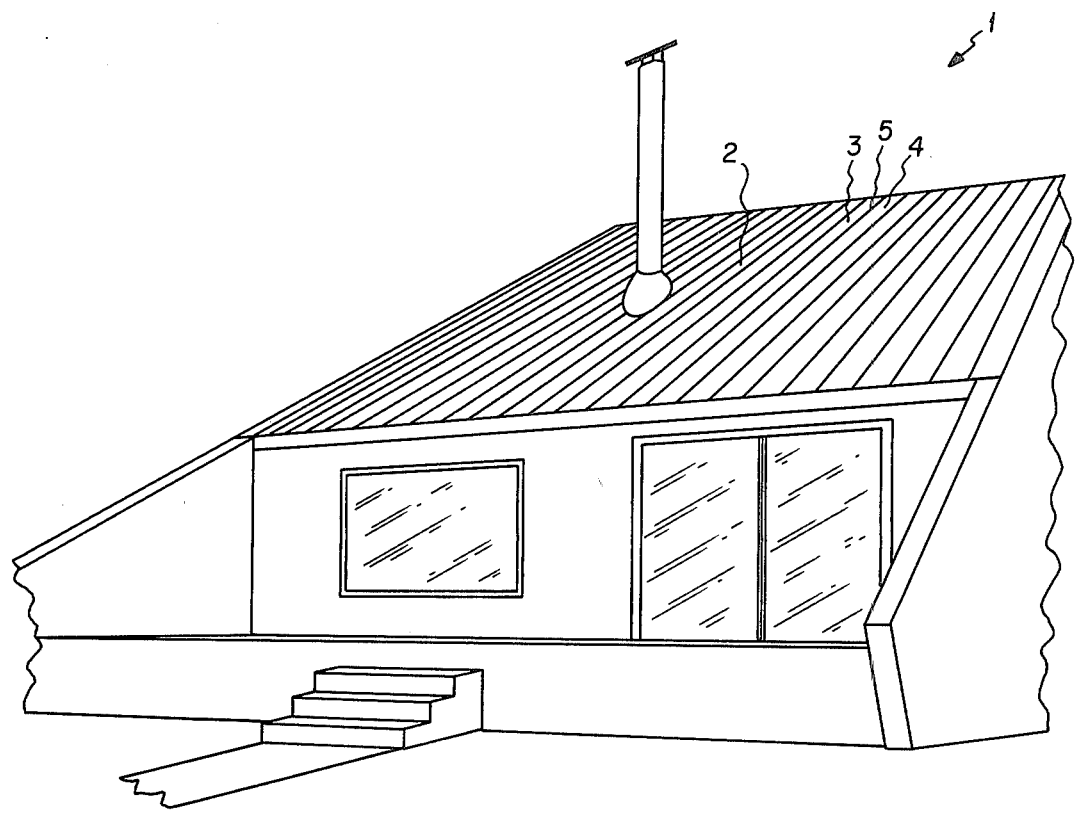
FIG. 1 shows a building with a conventional batten-seam roof.

More specifically, FIG. 1 shows building 1 with a batten-seam roof 2 of conventional construction wherein two longitudinally extending pans 3 and 4 are connected at their adjacent interface by a batten 5.

Figure 2:
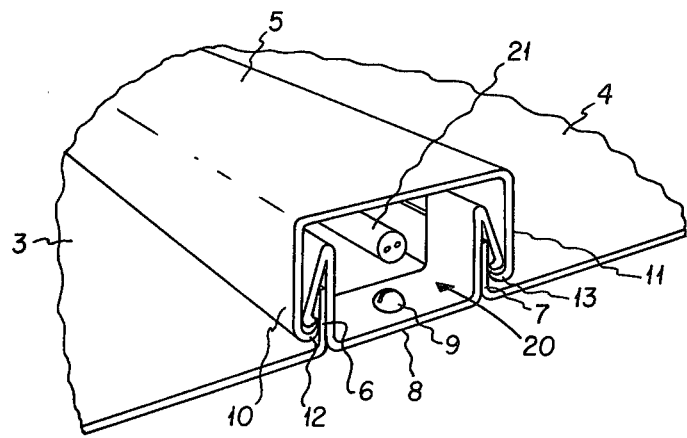
FIG. 2 shows a cross-section of one batten seam of the roof of FIG. 1 with the batten in place.

FIG. 2 shows pans 3 and 4 with their upstanding adjacent lips 6 and 7 joined to one another by an intermediate spacer and anchor clip 8. Clip 8 overlaps lips 6 and 7 and is fixed to the roof by screw means 9. Batten 5 has flanges 10 and 11 which overlap lips 6 and 7 and which have hook means 12 and 13 for fixing batten 5 onto clip 8 and physically attaching batten 5 to the roof. Batten 5 shields the area 20 between adjacent pans 3 and 4 and in so doing leaves open area 20.

In accordance with this invention one or more electrical conduits such as wires, cables, and the like, which are necessary for interconnecting a plurality of photovoltaic cell modules and/or for removing and transporting the electricity generated by at least one photovoltaic cell module into the interior of the building, are disposed in open area 20 as shown for conduit means 21.

Figure 3:
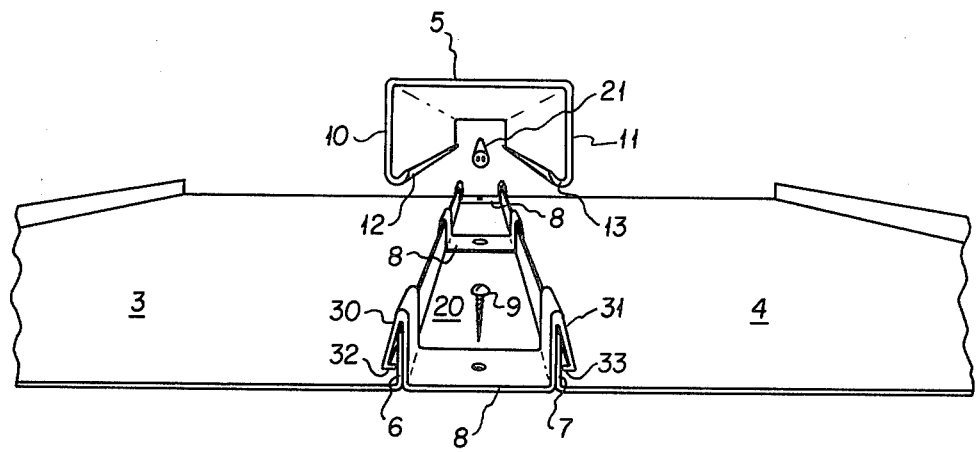
FIG. 3 shows the batten seam of FIG. 2 with the batten removed from the two pans which it interconnects.

FIG. 3 shows the batten-seam construction of FIG. 2 with batten 5 and screw means 9 removed so that it can be seen that a plurality of clips 8 are employed along the length of open space 20 between pans 3 and 4. It can also better be seen from FIG. 4 that each clip 8 has legs 30 and 31 for overlapping lips 6 and 7 to thereby fix pans 3 and 4 relative to one another. Further, legs 30 and 31 are equipped with inward extending projections 32 and 33 over which hook means 12 and 13 snap, to fix batten 5 to the roof.

Figure 4:
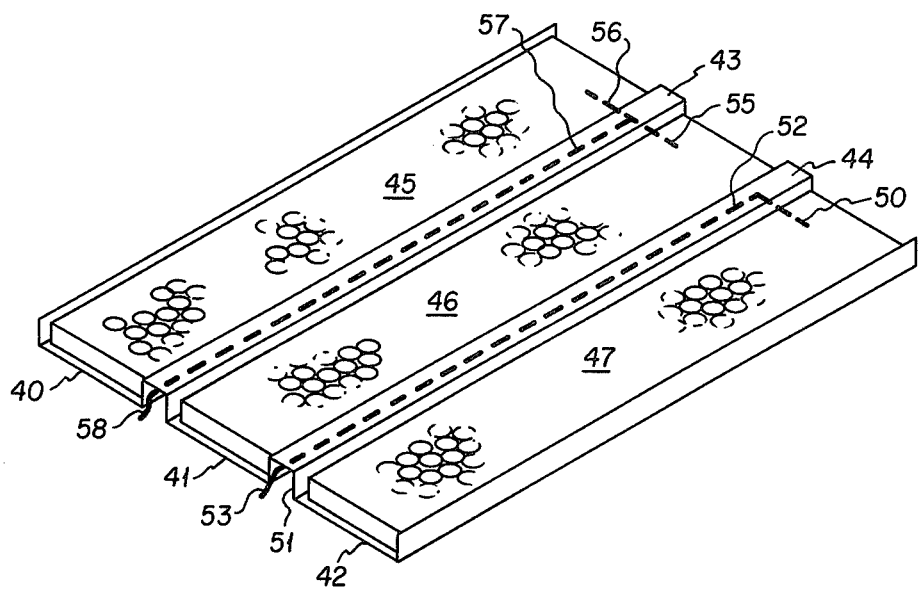
FIG. 4 shows the combination of three photovoltaic cell modules in three pans on a batten-seam roof in accordance with this invention.

FIG. 4 shows a plurality of three pans 40, 41 and 42 connected to one another by battens 43 and 44 in normal manner for a batten-seam roof. Pans 40 through 42 carry in each pan a photovoltaic cell module 45, 46 and 47, respectively. An electrical conduit 50 for removing generated electricity from module 47 passes from module 47 through lip 51 of pan 42 and into the interior of batten 44, the interior of which is similar to interior 20 of pans 3 and 4 and batten 5 of FIG. 2. In the interior of batten 44 there is an electrical conduit 52 which is connected to conduit 50 and extends along the length of batten 44 to be removed from the end thereof as shown at 53 for passage into the interior of the building. Similarly, conduit means 55 of module 46 and conduit 56 of module 45 pass to the interior of batten 43 to connect with electrical conduit 57. Conduit 57 also passes along the length of batten 43 and is removed from the end thereof at 58 for passage into the interior of the building or other disposition as desired.

The batten and pan can be composed of any known material such as metal (steel, aluminum, copper, etc.), plastic, ceramics, and concrete reinforced by numerous materials such as metal bars, screens, glass fibers, and the like.

It can be seen that in accordance with this invention a plurality of photovaltaic cell modules can be disposed in the natural depressions of the standard batten-seam roof, and the necessary wiring associated with those modules essentially hidden from the viewer. This protects the aesthetic quality of the roof itself while at the same time protecting primarily all such wiring from exposure to the elements. This invention produces a nearly ideal combination of modern solar technology with old and widely accepted roof construction in a manner which has minimal aesthetic impact and major convenience and protection for wiring necessary to photovoltaic cell modules.

Reasonable variations and modifications are possible within the scope of this disclosure without departing from the spirit and scope of this invention.

The embodiments of the invention in which an exclusive property or privilege is claimed are defined as follows:

1. In a batten-seam and pan roof construction, the improvement comprising at least one photovoltaic cell module carried by said roof, and at least one electrical conduit means connected to said at least one photovoltaic module, said electrical conduit means being disposed primarily under the battens of said roof.

2. A roof construction according to claim 1 wherein said at least one photovoltaic cell module is disposed in the pan part of said roof.

3. A roof construction according to claim 1 wherein the pans and battens are formed from reinforced concrete.

4. A roof construction according to claim 3 wherein the reinforcing material is glass fibers.

* * * * *